(12) United States Patent
Fahrbach

(10) Patent No.: US 12,326,549 B2
(45) Date of Patent: Jun. 10, 2025

(54) OPTICAL ASSEMBLY FOR AN INCLINED-PLANE MICROSCOPE FOR IMPROVING THE RESOLUTION

(71) Applicant: LEICA MICROSYSTEMS CMS GMBH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 494 days.

(21) Appl. No.: 17/914,368

(22) PCT Filed: Mar. 29, 2021

(86) PCT No.: PCT/EP2021/058071
§ 371 (c)(1),
(2) Date: Sep. 26, 2022

(87) PCT Pub. No.: WO2021/198129
PCT Pub. Date: Oct. 7, 2021

(65) Prior Publication Data
US 2023/0104545 A1    Apr. 6, 2023

(30) Foreign Application Priority Data
Mar. 30, 2020 (DE) .................. 10 2020 204 066.4

(51) Int. Cl.
*G02B 21/00* (2006.01)
*G02B 21/02* (2006.01)
*G02B 21/36* (2006.01)

(52) U.S. Cl.
CPC ....... *G02B 21/0032* (2013.01); *G02B 21/008* (2013.01); *G02B 21/02* (2013.01); *G02B 21/361* (2013.01)

(58) Field of Classification Search
CPC .. G02B 21/0032; G02B 21/008; G02B 21/02; G02B 21/361; G02B 21/0076; G02B 21/367
See application file for complete search history.

(56) References Cited

U.S. PATENT DOCUMENTS 8,582,203 B2    11/2013 Dunsby
9,671,600 B2 *   6/2017 Bathe ................. G02B 27/58
(Continued)

FOREIGN PATENT DOCUMENTS

DE    102018204940 A1    10/2019
JP    2017/504836 A       2/2017
(Continued)

*Primary Examiner* — Mustak Choudhury
(74) *Attorney, Agent, or Firm* — LEYDIG, VOIT & MAYER, LTD.

(57) ABSTRACT

An optical arrangement for an inclined-plane microscope, includes: an optical illumination and detection arrangement, an optical erecting unit for imaging the real intermediate image on a detector, wherein an optical axis of the erecting unit is inclined with respect to an optical axis of the optical illumination and detection arrangement and is oriented substantially perpendicularly to the real intermediate image plane, and an attachment element arranged on the erecting unit, extending in a direction of the real intermediate image, and forming an interface which is oriented substantially parallel to the real intermediate image plane, wherein beam paths of the illumination light and of the scattered and/or fluorescent light transmitted by the illumination and detection arrangement are coupled in and intersect on the image side of the illumination and detection arrangement, and wherein the beam path of the illumination light is spaced apart from the interface.

20 Claims, 4 Drawing Sheets

(56) References Cited

U.S. PATENT DOCUMENTS

| | | | |
|---|---|---|---|
| 10,477,124 B2 | 11/2019 | Lippert et al. | |
| 10,802,255 B2 * | 10/2020 | Kozorovitskiy | G02B 21/0032 |
| 10,983,327 B2 | 4/2021 | Fahrbach | |
| 11,067,783 B2 * | 7/2021 | Schumann | G02B 21/002 |
| 2011/0261446 A1 * | 10/2011 | Dunsby | G02B 21/16 |
| | | | 359/380 |
| 2016/0327779 A1 * | 11/2016 | Hillman | G02B 21/0032 |
| 2017/0351083 A1 * | 12/2017 | Ishiwata | G02B 21/0088 |
| 2019/0049711 A1 | 2/2019 | Schumann | |
| 2019/0167081 A1 | 6/2019 | Hillman | |
| 2019/0204573 A1 * | 7/2019 | Fahrbach | G02B 21/008 |
| 2019/0324244 A1 | 10/2019 | Kozorovitskiy et al. | |
| 2019/0361213 A1 | 11/2019 | Fahrbach | |
| 2021/0072524 A1 | 3/2021 | Fahrbach | |

FOREIGN PATENT DOCUMENTS

| | | |
|---|---|---|
| JP | 2017/530404 A | 10/2017 |
| JP | 2019/505856 A | 2/2019 |
| JP | 2019/526827 A | 9/2019 |
| WO | WO 2010/012980 A1 | 2/2010 |
| WO | WO 2015/109323 A2 | 7/2015 |
| WO | WO 2018/050888 A1 | 3/2018 |
| WO | WO 2018/064149 A1 | 4/2018 |

\* cited by examiner

OPTICAL ASSEMBLY FOR AN INCLINED-PLANE MICROSCOPE FOR IMPROVING THE RESOLUTION

CROSS REFERENCE TO RELATED APPLICATIONS

This application is a U.S. National Phase application under 35 U.S.C. § 371 of International Application No. PCT/EP2021/058071, filed on Mar. 29, 2021, and claims benefit to German Patent Application No. DE 10 2020 204 066.4, filed on Mar. 30, 2020. The International Application was published in German on Oct. 7, 2021 as WO 2021/198129 A1 under PCT Article 21(2).

FIELD

The invention relates to an optical arrangement for an inclined-plane microscope, for example an oblique plane illumination microscope (OPM) or a swept confocally aligned planar excitation microscope (SCAPE).

BACKGROUND

The solutions from the prior art have a limited resolution due to the limited numerical aperture NA, can have the disadvantage that they are susceptible to dust and similar contamination, or require additional optical elements for coupling in illumination light, which reduces efficiency.

SUMMARY

In an embodiment, the present disclosure provides an optical arrangement for an inclined-plane microscope, wherein the optical arrangement comprises, an optical illumination and detection arrangement configured to transmit illumination light in a direction of a sample volume and to form with the illumination light a light sheet oriented obliquely to an optical axis of the illumination and detection arrangement in the sample volume, and collect and transmit scattered and/or fluorescent light from a region of the sample volume illuminated with the light sheet, wherein the optical illumination and detection arrangement is configured to image the illuminated region of the sample as a real intermediate image in a real intermediate image plane which is oriented obliquely with respect to the optical axis of the optical illumination and detection arrangement and is formed on an image side of the illumination and detection arrangement facing away from the sample volume, an optical erecting unit for imaging the real intermediate image on a detector, wherein an optical axis of the erecting unit is inclined with respect to the optical axis of the optical illumination and detection arrangement and is oriented substantially perpendicularly to the real intermediate image plane, and an attachment element which is arranged on the erecting unit, extends in a direction of the real intermediate image, and forms an interface which is oriented substantially parallel to the real intermediate image plane, wherein beam paths of the coupled-in illumination light and of the scattered and/or fluorescent light transmitted by the illumination and detection arrangement intersect on the image side of the illumination and detection arrangement, and wherein the beam path of the illumination light is spaced apart from the interface of the attachment element.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
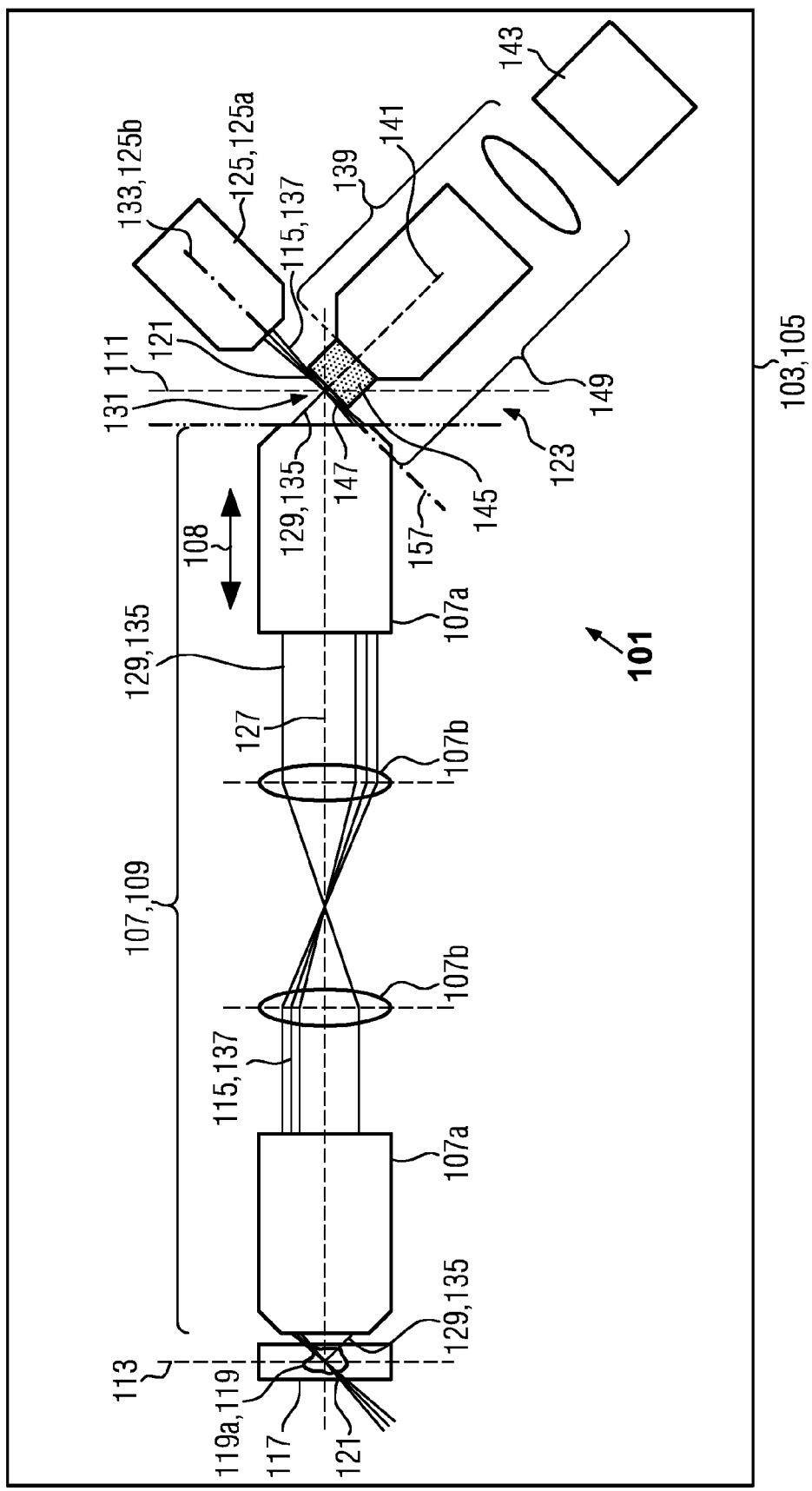
FIG. 1 shows a first embodiment of the optical arrangement according to the invention.

In an embodiment, the present invention eliminates disadvantages of prior art microscopes and provides optical arrangements for inclined-plane microscopes which enable a higher resolution as well as a higher light output.

In an embodiment, the present invention achieves advantages over conventional microscopes by virtue of the fact that the optical arrangement has an optical illumination and detection arrangement that is designed to transmit illumination light in the direction of a sample volume and to form with the illumination light a light sheet oriented obliquely to an optical axis of the illumination and detection arrangement in the sample volume, and to collect and transmit scattered and/or fluorescent light from a region of the sample volume illuminated with the light sheet, wherein the optical illumination and detection arrangement is further configured to image the illuminated region of the sample as a real intermediate image in a real intermediate image plane which is oriented obliquely with respect to the optical axis of the optical illumination and detection arrangement and is formed on an image side of the illumination and detection arrangement facing away from the sample volume. The optical arrangement further comprises an optical erecting unit for imaging the real intermediate image onto a detector, wherein an optical axis of the erecting unit is inclined with respect to the optical axis of the optical illumination and detection arrangement and is oriented substantially perpendicularly to the real intermediate image plane; and an attachment element which is arranged on the erecting unit, extends in the direction of the real intermediate image, and forms an interface which is oriented substantially parallel to the real intermediate image plane. According to an embodiment of the invention, beam paths of the coupled-in illumination light and of the scattered and/or fluorescent light transmitted by the illumination and detection arrangement intersect on the image side of the illumination and detection arrangement, wherein the beam path of the illumination light is spaced apart from the interface of the attachment element.

Such spacing can be realized either by a parallel displacement or by tilting between the beam path of the illumination light and the interface of the attachment element. These two possibilities will be discussed later in the course of this description. The beam path of the illumination light thus does not run through the interface. The term "spaced apart" is therefore to be understood to mean that the beam path of the illumination light does not meet the interface.

The optical arrangement according to an embodiment of the invention thus has the advantage that the numerical aperture (NA) of the erecting unit can be increased by means of the attachment element. A higher numerical aperture has a positive effect on the resolution of the imaging by the erecting unit, i.e. it increases it. Furthermore, due to the spacing between the beam path of the illumination light and the interface of the attachment element, the illumination light can be coupled unhindered into the illumination and detection arrangement on the image side of the illumination and detection arrangement facing away from the sample volume. No further optical element, such as a dichroic mirror, is necessary herefor. This dichroic mirror, which is often used in the prior art, has the disadvantage that it is arranged there in the optical illumination and detection arrangement in the beam path of the scattered and/or fluorescent light and can therefore attenuate and/or delimit it.

A further advantage of such an arrangement according to an embodiment of the invention is the possibility of shifting the light sheet formed in the sample volume by moving at least one element of the illumination and detection arrangement in the direction of its optical axis and thereby being able to scan a sample. This is not possible if the coupling takes place via a dichroic mirror in the illumination and detection arrangement. The arrangement according to an embodiment of the invention allows the illumination light to be coupled unhindered into the illumination and detection arrangement on the image side of the illumination and detection arrangement facing away from the sample volume owing to the spacing between the beam path of the illumination light and the interface of the attachment element.

The optical arrangement can be improved by further additional technical features. Possible embodiments with additional technical features are described below. The technical features of different embodiments can be combined with one another as desired or omitted if the technical effect associated with the omitted technical feature does not determine the invention.

The optical illumination and detection arrangement is preferably constructed symmetrically or approximately symmetrically. This means that the optical illumination and detection arrangement can be made up of identical optical components when viewed from an upper side facing the sample volume and when viewed from the image side located opposite thereto. The illumination and detection arrangement is thus mirror-symmetric to a plane which is oriented perpendicularly to an optical axis of the illumination and detection arrangement and is arranged in the center thereof. If different objectives are required in an apparatus according to the invention, the optical illumination and detection arrangement is identical to the above description of the approximately symmetric setup only in terms of the general structural setup with regard to the function of the components used. That is to say, the setup of objective, tube lens, possibly two scan lenses, tube lens and objective. However, the focal lengths and/or the numerical aperture of the elements can differ.

The illumination and detection arrangement can be a 4f setup, for example. The illumination and detection arrangement preferably comprises at least two oppositely oriented objectives. Further (tube) lenses can also be present.

A light sheet is known from the prior art, as is the possibility of generating a static or quasi-static light sheet (by scanning a line with a beam of rays). In this optical setup, different regions of the illumination and detection arrangement are preferably used respectively for illumination and detection. The beam paths of the illumination light and also of the scattered and/or fluorescent light in the illumination and detection arrangement are thus spatially separated from one another, but can intersect in the illumination and detection arrangement.

Owing to the preferably symmetric setup of the illumination and detection arrangement, a light sheet formed on the image side of the illumination and detection arrangement can be imaged in the sample volume. The light sheet imaged there illuminates the sample, which emits scattered and/or fluorescent light. This emitted light is collected by the illumination and detection arrangement, is transmitted to the image side, and imaged as a real intermediate image in the corresponding intermediate image plane. Both the light sheet to be imaged (imaging from the image side to the sample side) and the illuminated region of the sample volume to be imaged (imaging from the sample side to the image side) are oriented obliquely, i.e. at an angle other than 90°, with respect to the optical axis of the illumination and detection arrangement.

In order to be able to image this obliquely oriented real intermediate image sharply and without distortion onto a detector, the optical axis of the erecting unit is inclined with respect to the optical axis of the illumination and detection arrangement and is oriented substantially perpendicularly to the real intermediate image plane.

An attachment element is preferably to be understood to mean an element made of an optical material with a refractive index greater than air. The attachment element can preferably consist of a material which is transparent at least for the wavelengths of the scattered and/or fluorescent light. This is preferably a glass-like or ceramic-like material, which with further preference is also transparent for the illumination light. The interface is a boundary surface (side) of the attachment element on the intermediate-image side (i.e. facing away from the erecting unit), with which the attachment element is spatially delimited. The interface is substantially perpendicular to the optical axis of the erecting unit and typically represents an end of the attachment element which is spaced apart from the erecting unit. Nevertheless it is possible, in some embodiments, to define a plane that is at least in part (i.e. in the region of the interface) congruent with the interface and intersects further regions, for example the peripheral region of the attachment element. Furthermore, fastening structures for fastening the attachment element can be provided in these peripheral regions.

The attachment element is substantially characterized by its interface. The attachment element can have different shapes, for example cuboid, cubical, or frustoconical, wherein the interface is one side face of such a structure. If the attachment element is formed as a truncated cone, the base of such an attachment element can be located on the erecting unit, and the top surface can comprise or constitute the interface. A region that is defined by the interface and can be imaged by the erecting unit is preferably larger than the dimensions of the relevant region, i.e. the region to be imaged, of the real intermediate image (also known as 'field of interest'). The interface formed on the attachment element can thus be at least a part of the boundary surface of the attachment element on the intermediate-image side, which is perpendicular to the optical axis of the erecting unit.

A frustoconical design of the attachment element has the advantage that the possible taper toward the interface makes it possible for optical setups to be positioned more closely together, i.e. the illumination and detection arrangement to the erecting unit and, where appropriate, to an illumination optical unit, than, for example, when using cylindrical attachment elements.

According to an embodiment of the invention, coupling of the illumination light and the imaging of the real intermediate image of the scattered and/or fluorescent light on the image side of the illumination and detection arrangement take place such that the beam paths of the illumination light and of the scattered and/or fluorescent light intersect on this image side. By spacing the beam path of the illumination light apart from the interface of the attachment element, shading of the illumination light can be avoided and correct illumination of a region of a sample arranged in the sample volume can be ensured.

The attachment element can preferably be integrated into the optical erecting unit, forming a common component. This has the advantage that the common component that is created in this way can be easily exchanged without requiring further orientation or adjustment of the attachment element relative to the optical erecting unit.

Furthermore, the erecting unit can be an immersion objective. These are commercially available and can therefore be used immediately after the corresponding immersion medium has been made available. However, the attachment element is preferably made of a solid optical material.

In an embodiment of the optical arrangement according to the invention, the interface of the attachment element can be arranged spaced apart from the real intermediate image plane in the direction of the optical axis of the erecting unit. Such an arrangement has the advantage that defects localized on the interface, such as surface roughness, surface inaccuracies or dust or other foreign bodies deposited on the interface, are no longer imaged sharply on a detector by the erecting unit. The influence of such defects on the imaging quality of the erecting unit can be significantly reduced by spacing the interface apart from the real intermediate image plane.

It is particularly advantageous here if the interface is at a distance from the real intermediate image plane which is at least half a maximum light sheet thickness of the illumination light in the direction of the optical axis of the erecting unit. In particular, the region of the light sheet provided on the sample side of the illumination and detection arrangement, which region is located in front of or behind the interface with respect to the optical axis of the erecting unit, is considered here. A distance selected in this way has the advantage that the beam path of the illumination light does not intersect the interface of the attachment element and can therefore reach the illumination and detection arrangement unhindered in order to thereby form the light sheet in the sample volume after imaging.

The beam path for the illumination light and for the scattered and/or fluorescent light is to be understood in particular to mean that region of the light beam within which a prespecified proportion of a beam size of the observed light of the light beam is measured. Here, for example with a Gaussian distribution of a light parameter over the beam cross section, the drop in the electric field strength to 1/e or in the intensity to 1/e2 can be observed. In such an observation, the boundaries of a light beam are considered to be that region in which the intensity of the light beam has fallen to 1.8% of the maximum intensity. The diameter of a beam path can preferably be defined to be twice to three times the $(1/e^2)$ value of the intensity. Here, double the $(1/e^2)$ value of the intensity can serve as the lower limit for defining the diameter of the beam path. Preferably, the distance for defining the beam diameter can be selected to be larger, for example five times $(1/e^2)$ value. The $(1/e^2)$-drop in intensity corresponds to the dimension of a length and characterizes the distance from the point of maximum intensity of the beam to a point at which the intensity is only $1/e^2$ of said maximum intensity (in a Gaussian beam profile, this length corresponds to a radius). Similar definitions for the beam diameter can be established for non-Gaussian beam profiles.

The optical arrangement can be further improved by virtue of the fact that the attachment element is designed cylindrically symmetrically to the optical axis of the erecting unit. Cylindrical optical materials have the advantage that they are easy to produce. If such a cylindrically symmetric attachment element is used, the interface of the attachment element can be arranged spaced apart from the real intermediate image plane toward the erecting unit in the direction of the optical axis of the erecting unit. Thus, viewed from the direction of the erecting unit, the beam path of the illumination light extends in front of the attachment element, wherein the beam path of the illumination light does not intersect the interface.

Alternatively, the attachment element can be arranged at least partially in the beam path of the illumination light. With such an arrangement, however, the use of a cylindrically symmetric attachment element is not possible. In such an embodiment, the interface can thus be arranged so as to be displaced away from the optical erecting unit and substantially toward the optical illumination and detection arrangement. In this embodiment, the optical axis of an illumination optical unit providing, i.e. transmitting, the illumination light (and thus also the beam path of the illumination light) passes through the attachment element.

This optical axis can preferably be oriented perpendicularly to the axis of the erecting unit. In particular, the optical axis of the illumination light can be spaced apart from the interface by a distance that is at least half the light sheet thickness of the light sheet now formed in the attachment element. This ensures that the light sheet is formed in the attachment element but does not intersect the interface.

In an embodiment, the attachment element can have a coupling-in facet and a coupling-out facet, which are configured to couple the illumination light into or out of the attachment element. Both the coupling-in facet and the coupling-out facet are preferably oriented parallel to one another and can with further preference be oriented perpendicularly to the optical axis of the illumination optical unit and also to a coupling-in direction of the illumination light. The use of a coupling-in and/or coupling-out facet arranged at Brewster's angle is conceivable, but constitutes a very special embodiment of the optical arrangement according to the invention.

If the interface is spaced apart from the intermediate image plane, further aberrations of the erecting unit can occur. These can be countered by appropriate countermeasures, such as the use of correction rings.

Alternatively or additionally, the optical arrangement according to an embodiment of the invention can in an embodiment further comprise a reflective element, arranged on the image side of the optical illumination and detection arrangement, for deflecting the illumination light into the optical illumination and detection arrangement. The reflective element can be a metallic or dielectric mirror, which can also be electrically controllable or electrically deformable.

The reflective element can be arranged in a region that lies between the illumination and detection arrangement and the erecting unit. The reflective element can preferably be mounted to the attachment element or be integrated into it.

The use of a reflective element for deflecting the illumination light into the illumination and detection arrangement allows the attachment element to extend with its interface up to the real intermediate image plane and enables the illumination light to be coupled in on the image side of the illumination and detection arrangement. This in turn allows simple scanning of the light sheet in the sample volume by moving at least one element of the illumination and detection arrangement along the optical axis thereof.

The use of a reflective element is independent of the position of the interface with respect to the intermediate image plane.

The reflective element can be fixedly mounted to the attachment element or be mounted thereto so as to be repeatedly detachable. The reflective element is either adjustable at the attachment element or is adjusted before it is mounted to the attachment element.

In an advantageous embodiment of the optical arrangement according to the invention, said optical arrangement further comprises an illumination optical unit which provides the illumination light and has an optical axis which is oriented obliquely to the interface. The beam path of the illumination light is thus oriented obliquely to the interface of the attachment element. In other embodiments, the optical axis of the illumination optical unit and the reflective element for coupling the illumination light into the illumination and detection arrangement can be oriented in such a way that the reflective element is oriented parallel to the interface. It is further conceivable that a region of the attachment element adjoining the interface is mirrored for the illumination light, i.e. it reflects it, so that the reflective element is formed monolithically with the attachment element. However, the reflective element is preferably a separate optical component. In any case, the optical axis of the illumination light is spaced apart from and does not intersect the interface. In the event of the embodiment of a reflective region that adjoins the interface, this reflective region is not part of the interface of the attachment element.

Furthermore, the illumination optical unit can be oriented in such a way that its optical axis is directed past the attachment element.

Thus, in summary, there are two possibilities for disposing the beam path of the illumination light spaced apart from the interface of the attachment element. This is possible by displacing the interface in the direction of the optical axis of the erecting unit. This displacement can lead to the beam path of the illumination light extending past the attachment element, i.e. without passing through it in part, or passing through the attachment element.

Regardless of such a displacement of the interface of the attachment element with respect to the real intermediate image plane or from the beam path of the illumination light, which by definition is formed as a light sheet in this real intermediate image plane, it is possible to use the reflective element to couple the illumination light into the illumination and detection arrangement. When using the reflective element, the spacing between the beam path of the illumination light and the interface is realized by tilting the two relative to one another rather than by parallel displacement. These two possibilities can also be combined with one another.

The term "and/or" comprises any combination of one or more of the associated elements mentioned and may be abbreviated by "/".

Although some aspects have been described as they relate to an apparatus, it is clear that these aspects also represent a description of the corresponding method, where a block or an apparatus corresponds to a method step or to a function of a method step. Analogously, aspects that are described as relating to a method step also represent a description of a corresponding block or element or of a property of a corresponding apparatus.

The optical arrangement according to an embodiment of the invention will be described in more detail below with reference to the accompanying drawings. The drawings show purely exemplary embodiments of the optical arrangement according to the invention for an inclined-plane microscope or specific exemplary embodiments of inclined-plane microscopes. These embodiments do not limit the subject matter for which protection is sought.

In the following explanations, identical technical features and features of the same technical function are provided with the same reference sign. The technical features described below can be combined with one another as desired.

FIG. 1 shows an optical arrangement 101 according to an embodiment of the present invention. The optical arrangement 101 can be part of an inclined-plane microscope 103, such as an OPM microscope 105. The inclined-plane microscope 103 is indicated only schematically by a border in FIG. 1.

The optical arrangement 101 comprises an optical illumination and detection arrangement 107, which has a symmetric design. It includes two objectives 107a and two tube lenses 107b. Due to the symmetric setup of the optical illumination and detection arrangement 107, the latter constitutes what is known as a 4f telescope 109.

The latter has the property of imaging a light distribution, for example of illuminated regions of a sample, from a first focal plane 111 to a second focal plane 113 in 1:1 imaging. Since optical paths are reversible, it is also possible to image a light distribution from the second focal plane 113 into the first focal plane 111. This is used for illumination.

The illumination and detection arrangement 107 is configured to transmit illumination light 115 in the direction of a sample volume 117 and to form a light sheet 121 in the sample volume 117 in which a sample 119 can be located.

A light sheet 121 is to be understood to mean a substantially 2-dimensionally illuminated region. This can be provided either statically, for example by using cylindrical lenses, or dynamically by using pulsed illumination.

The light sheet 121 shown in the sample volume 117 is already formed on an image side 123 of the optical illumination and detection arrangement 107 and is imaged into the sample volume 117 by the illumination and detection arrangement 107.

In the embodiment shown, the illumination light 115 is coupled from the image side 123 into the illumination and detection arrangement 107 along a beam path 135 of the scattered and/or fluorescent light 129 by an illumination optical unit 125. The image side 123 lies on a side of the illumination and detection arrangement 107 facing away from the sample volume 117.

The coupling preferably takes place on the image side 123, since such coupling allows the light sheet 121 to be moved in the sample volume 117 by means of a movement 108 of an objective 107a, and thus, for example, for the sample 119 to be scanned or rastered.

The light sheet 121 is oriented obliquely to an optical axis 127 of the optical illumination and detection arrangement 107 both on the sample side 123 and in the sample volume 117.

The regions 119a of the sample 119 illuminated by the light sheet 121 in the sample volume 117 emit scattered and/or fluorescent light 129, which is shown merely schematically by a single symbolic ray.

The optical illumination and detection arrangement 107 collects the scattered and/or fluorescent light 129 and transmits it. It thus images the region 119a of the sample 119 illuminated by the light sheet 121 according to the schematic beam path shown on the sample side 123 as a real intermediate image 131 in a real intermediate image plane 133. The light sheet 121 formed on the sample side 123 also lies in said intermediate image plane, with the result that the beam path 135 of the scattered and/or fluorescent light 129 and the beam path 137 of the illumination light 115 intersect on the sample side 123.

The real intermediate image 131 and the real intermediate image plane 133 are also oriented obliquely to the optical axis 127 of the illumination and detection arrangement 107.

Furthermore, the optical arrangement 101 comprises an optical erecting unit 139 having an optical axis 141 which is oriented substantially perpendicularly to the real intermediate image plane 133 and obliquely to the optical axis 127 of the illumination and detection arrangement 107. Due to its tilt, the optical erecting unit 139 enables undistorted imaging of the real intermediate image 131 on a detector 143.

An attachment element 145 is arranged on the optical erecting unit 139 and extends from the erecting unit 139 in the direction of the real intermediate image 131.

The attachment element 145 forms an interface 147 oriented substantially parallel to the real intermediate image plane 133. This interface 147 is planar and not curved. A more detailed illustration of the interface 147 is shown in the following figures.

FIG. 1 further shows that the beam path 137 of the illumination light 115 is spaced apart from the interface 147 of the attachment element 145.

The attachment element 145 can be integrated into the optical erecting unit 139 and form a common component 149.

Figure 2:
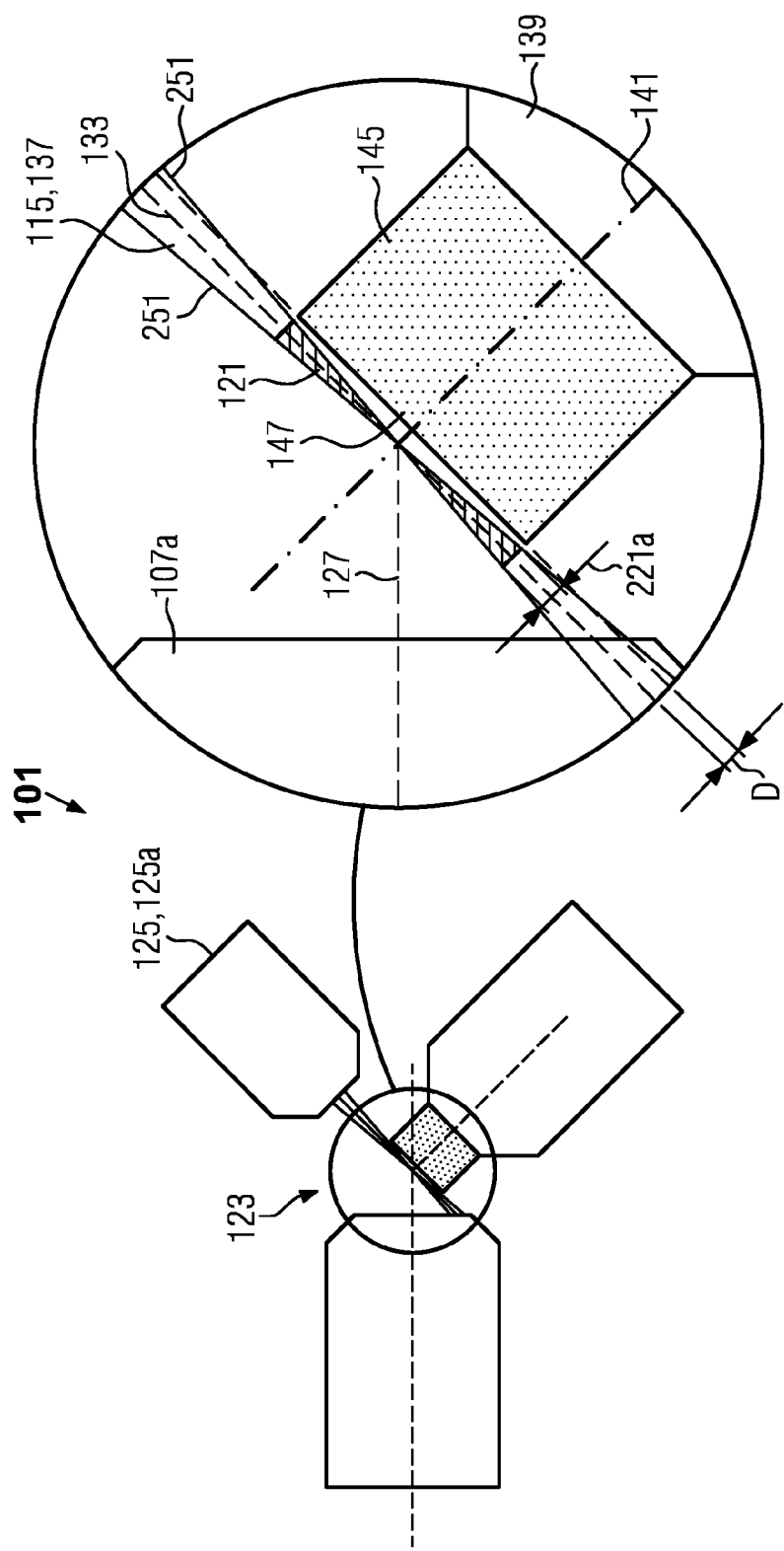
FIG. 2 shows a detailed illustration of the optical arrangement of FIG. 1.
Figure 3:
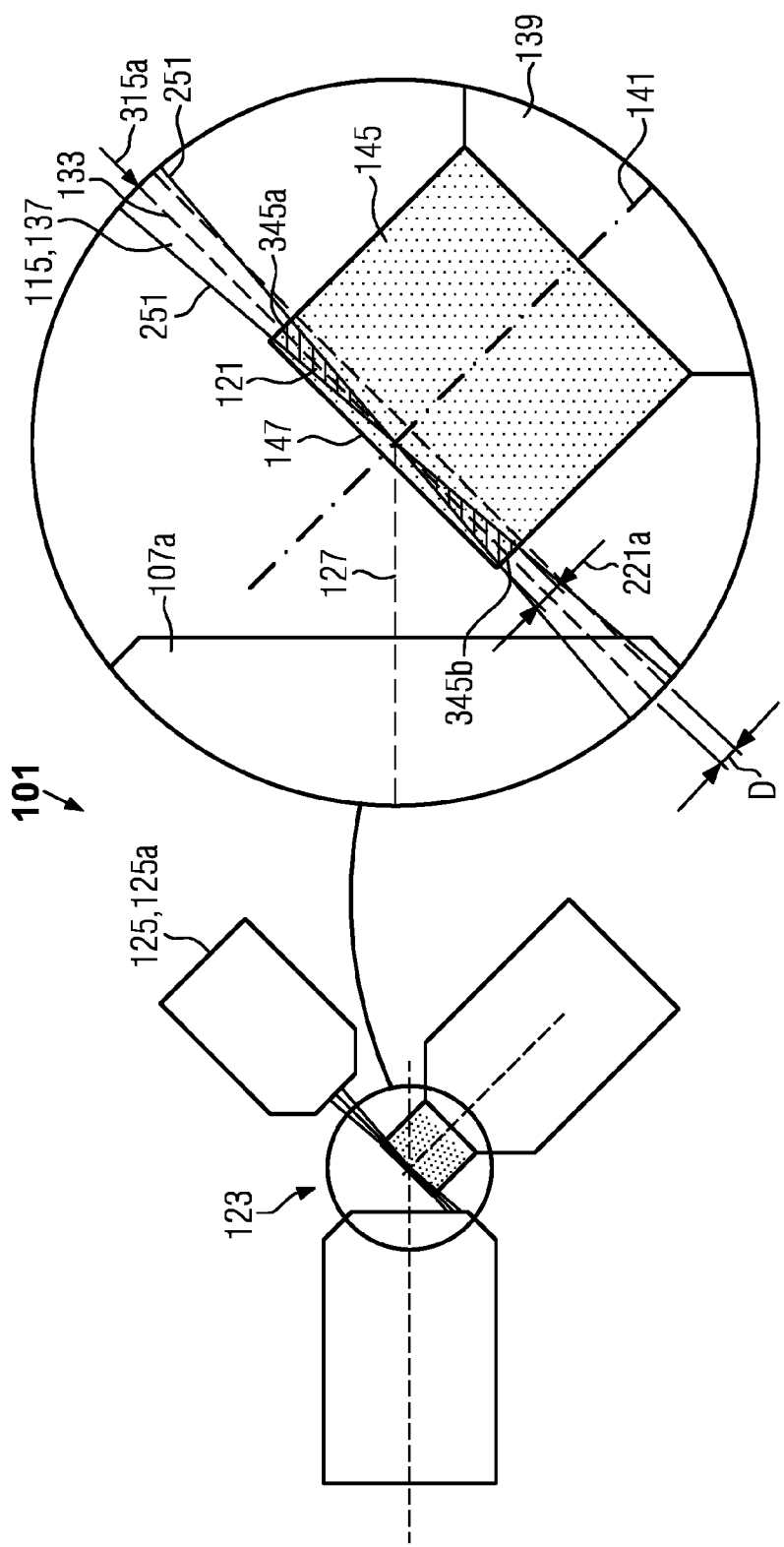
FIG. 3 shows a detailed illustration of an embodiment of an optical arrangement according to the invention.

A region of the image side 123 of the optical illumination and detection arrangement 107 is shown enlarged in FIG. 2 and FIG. 3. FIG. 2 shows the embodiment of the optical arrangement 101 indicated in FIG. 1, whereas FIG. 3 shows a further embodiment of the optical arrangement 101 according to the invention in detail. Other features of the optical arrangements 101 remain unchanged.

The figures each show the light sheet 121, indicated by hatching, which is oriented perpendicularly to the optical axis 141 of the erecting unit 139.

Envelopes 251 of the beam path 137 of the illumination light 115 are shown in each case in the figures. These envelopes can, for example, identify a region of the beam of the illumination light 115 in which the intensity of the illumination light 115 has dropped to $(1/e^2)$ times the maximum value of the intensity (e is Euler's number; other definitions of a beam cross section are possible).

In both figures, the interface 147 of the corresponding attachment element 145 is at a distance D from the real intermediate image plane 133. The distance D is identical for the embodiments shown in FIG. 2 and FIG. 3 and in the cases shown is half a light sheet thickness 221a, i.e. in the specifically shown specific case the distance between the maximum and the 1/e2-drop in intensity.

The embodiments of the optical arrangement 101 according to an embodiment of the invention shown in FIG. 2 and FIG. 3 differ in the direction along the respective optical axis 141 of the corresponding erecting unit 139 in which the interface 147 is arranged spaced apart from the real intermediate image plane 133.

In FIG. 2, the interface 147 is set back (toward the erecting unit 139) with respect to the intermediate image plane 133, whereas in FIG. 3, the interface 147 is displaced forward (away from the erecting unit 139) with respect to the intermediate image plane 133.

In the embodiment shown in FIG. 2, the illumination light 115 does not propagate through the attachment element 145.

In the embodiment shown in FIG. 3, by contrast, the optical beam path 137 of the illumination light 115 lies in part in the attachment element 145. For this purpose, this embodiment has a coupling-in facet 345a and a coupling-out facet 345b, both of which are oriented perpendicularly to the real intermediate image plane 133 (and thus also to the direction of propagation 315a of the illumination light 115) and perpendicularly to the optical axis 141 of the erecting unit 139.

Figure 4:
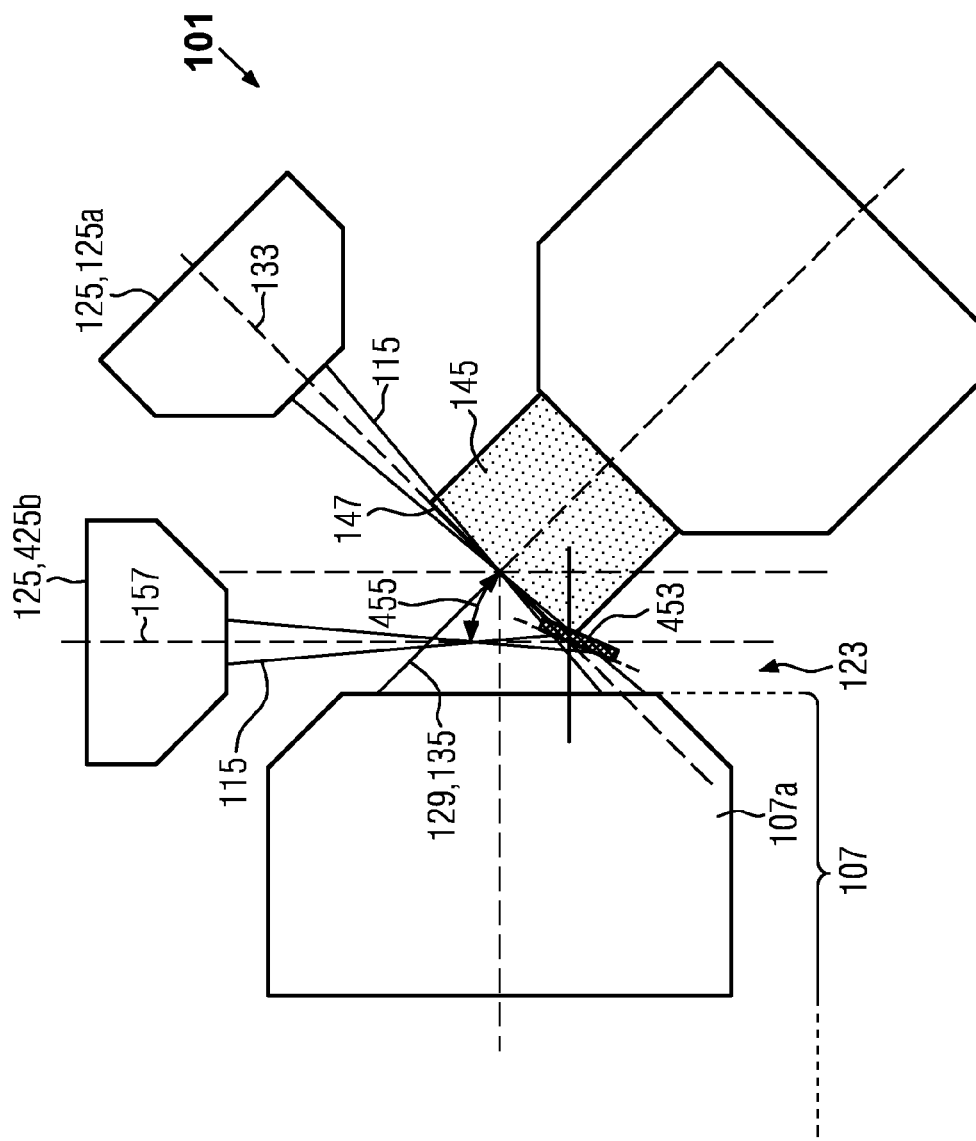
FIG. 4 shows a detailed illustration of an embodiment of an optical arrangement according to the invention.

FIG. 4 shows a further embodiment of the optical arrangement 101 according to an embodiment of the invention. In this embodiment, the interface 147 of the attachment element 145 is arranged in the real intermediate image plane 133. Such an arrangement has the effect that the position of the illumination optical unit 125 shown in the previously shown figures can no longer be used, since the attachment element 145 would in this case be shaded with respect to the illumination light 115. Such a first illumination position 125a as shown in FIGS. 1-3 is therefore no longer possible here.

For the embodiment of the optical arrangement 101 shown in FIG. 4, it is necessary to arrange the illumination optical unit 125 in a second illumination position 425b. In the embodiment shown, the illumination light 115 emitted by the illumination optical unit 125 is coupled into the optical illumination and detection arrangement 107 in the direction of a reflective element 453. In this case, an optical axis 457 of the illumination light 115 is oriented or arranged obliquely to the interface 147, i.e. also at the angle 455.

As can be seen in FIG. 4, in the embodiment shown in FIG. 4, which is purely exemplary, the optical axis 157 of the illumination optical unit 125 is directed past the attachment element 145.

The reflective element 453 is arranged obliquely with respect to the interface 147, i.e. at an angle 455, and is located on the image side 123 of the optical illumination and detection arrangement 107.

The reflective element 453 can be fixedly mounted to the attachment element 145 or be mounted thereto so as to be repeatedly detachable.

The use of the reflective element 453 shown in FIG. 4 can take place independently of a displacement of the interface with respect to the real intermediate image plane. A combination of both approaches is possible.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

101 Optical arrangement
103 Inclined-plane microscope
105 OPM microscope
107 Optical illumination and detection arrangement
107a Objective
107b Tube lens
108 Movement
109 4f telescope
111 First focal plane
113 Second focal plane
115 Illumination light
117 Sample volume
119 Sample
119a Region of the sample
121 Light sheet
123 Image side
125 Illumination optical unit
125a First illumination position
127 Optical axis of the optical illumination and detection arrangement
129 Scattered and/or fluorescent light
131 Real intermediate image
133 Real intermediate image plane
135 Beam path of the scattered and/or fluorescent light
137 Beam path of the illumination light
139 Optical erecting unit
141 Optical axis of the erecting unit
143 Detector
145 Attachment element
147 Interface
149 Common component
251 Envelope
315a Direction of propagation of the illumination light
345a Coupling-in facet
345b Coupling-out facet
425b Second illumination position
453 Reflective element
455 Angle
457 Optical axis of the illumination light
D Distance

The invention claimed is:

1. An optical arrangement for an inclined-plane microscope, wherein the optical arrangement comprises:
   an optical illumination and detection arrangement configured to:
      transmit illumination light in a direction of a sample volume and to form with the illumination light a light sheet oriented obliquely to an optical axis of the illumination and detection arrangement in the sample volume, and
      collect and transmit scattered and/or fluorescent light from a region of the sample volume illuminated with the light sheet, wherein the optical illumination and detection arrangement is configured to image the illuminated region of the sample as a real intermediate image in a real intermediate image plane which is oriented obliquely with respect to the optical axis of the optical illumination and detection arrangement and is formed on an image side of the illumination and detection arrangement facing away from the sample volume;
   an optical erecting unit for imaging the real intermediate image on a detector, wherein an optical axis of the erecting unit is inclined with respect to the optical axis of the optical illumination and detection arrangement and is oriented substantially perpendicularly to the real intermediate image plane; and
   an attachment element which is arranged on the erecting unit, extends in a direction of the real intermediate image, and forms an interface which is oriented substantially parallel to the real intermediate image plane,
   wherein beam paths of the coupled-in illumination light and of the scattered and/or fluorescent light transmitted by the illumination and detection arrangement intersect on the image side of the illumination and detection arrangement, and wherein the beam path of the illumination light is spaced apart from the interface of the attachment element.

2. The optical arrangement as claimed in claim 1, wherein the attachment element is integrated into the optical erecting unit, forming a common component.

3. The optical arrangement as claimed in claim 1, wherein the erecting unit is an immersion objective.

4. The optical arrangement as claimed in claim 1, wherein the interface of the attachment element is arranged spaced apart from the real intermediate image plane in a direction of the optical axis of the erecting unit.

5. The optical arrangement as claimed in claim 4, wherein the interface is at a distance from the real intermediate image plane which is at least half a maximum light sheet thickness of the illumination light in the direction of the optical axis of the erecting unit.

6. The optical arrangement as claimed in claim 1, wherein the attachment element is cylindrically symmetrical to the optical axis of the erecting unit.

7. The optical arrangement as claimed in claim 1, wherein the attachment element is arranged at least partially in the beam path of the illumination light.

8. The optical arrangement as claimed in claim 7, wherein the attachment element has a coupling-in facet and a coupling-out facet, which are configured to couple the illumination light into or out of the attachment element.

9. The optical arrangement as claimed in claim 1, further comprising a reflective element, arranged on the image side of the optical illumination and detection arrangement, for deflecting the illumination light into the optical illumination and detection arrangement.

10. The optical arrangement as claimed in claim 9, wherein the reflective element is mounted to the attachment element or is integrated into it.

11. The optical arrangement as claimed in claim 9, further comprising an illumination optical unit which provides the illumination light and has an optical axis which is oriented obliquely to the interface.

12. The optical arrangement as claimed in claim 11, wherein the optical axis of the illumination optical unit is directed past the attachment element.

13. The optical arrangement as claimed in claim 9, wherein the reflective element is fixedly mounted to the attachment element or is mounted thereto so as to be repeatedly detachable.

14. The optical arrangement as claimed in claim 9, wherein the reflective element is formed monolithically with the attachment element.

15. The optical arrangement as claimed in claim 1, wherein the attachment element comprises an optical material with a refractive index greater than air.

16. The optical arrangement as claimed in claim 1, wherein the attachment element comprises a material which is transparent at least for the wavelengths of the scattered and/or fluorescent light.

17. The optical arrangement as claimed in claim 1, further comprising fastening structures for fastening the attachment element, wherein the fastening structures are provided in peripheral regions of the attachment element.

18. The optical arrangement as claimed in claim 1, wherein the attachment element is cuboid or cubical or frustoconical.

19. The optical arrangement as claimed in claim 18 with a frustoconical attachment element, wherein a base of the attachment element is located on the erecting unit and a top surface of the attachment element comprises the interface.

20. The optical arrangement as claimed in claim 1, wherein the inclined-plane microscope is an oblique plane illumination microscope (OPM) or a swept confocally aligned planar excitation (SCAPE) microscope.

* * * * *